United States Patent [19]

Schümperli

[11] 4,428,405
[45] Jan. 31, 1984

[54] ELECTRONIC CONTROL DEVICE ON A GRIPPER SHUTTLE WEAVING MACHINE

[75] Inventor: Walter Schümperli, Wetzikon, Switzerland

[73] Assignee: Loepfe Brothers Limited, Zurich, Switzerland

[21] Appl. No.: 327,559

[22] Filed: Dec. 4, 1981

[30] Foreign Application Priority Data

Dec. 13, 1980 [CH] Switzerland ............ 9190/80

[51] Int. Cl.³ ............................................. D03D 51/40
[52] U.S. Cl. .................................. 139/341; 139/370.2
[58] Field of Search ............. 139/341, 342, 336, 370.1, 139/370.2

[56] References Cited

U.S. PATENT DOCUMENTS

| | | | |
|---|---|---|---|
| 2,981,296 | 4/1961 | Paul et al. | 139/341 |
| 4,073,319 | 2/1978 | Linka et al. | 139/341 |
| 4,250,931 | 2/1981 | Zeleny | 139/341 |

FOREIGN PATENT DOCUMENTS

| | | | |
|---|---|---|---|
| 47-13465 | 4/1972 | Japan | 139/341 |
| 469839 | 4/1969 | Switzerland | 139/341 |

Primary Examiner—Henry Jaudon
Attorney, Agent, or Firm—Werner W. Kleeman

[57] ABSTRACT

An inductive projectile sensor on a gripper shuttle weaving machine or loom comprises a flat induction coil surrounding at least one of the guide teeth which are mounted on the lathe beam of the weaving machine to form a guide duct for the projectile when passing through the weaving shed. Means for magnetizing the guide tooth or teeth, such as a permanently magnetized small plate or lamella, are provided beneath the induction coil to form a magnetic core or bridge between two neighboring guide teeth, one of which is surrounded by the induction coil.

6 Claims, 7 Drawing Figures

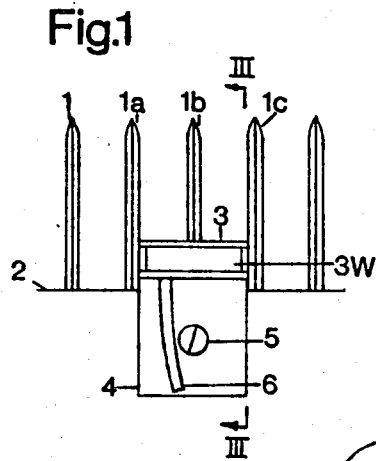
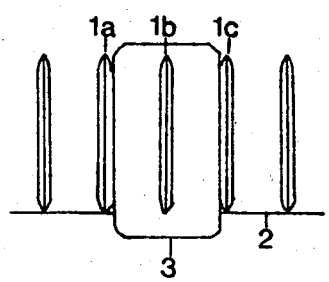
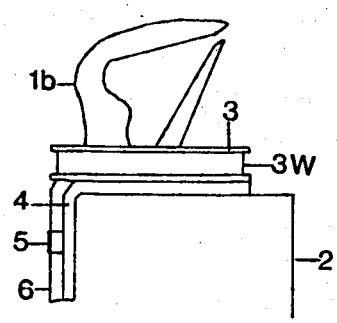
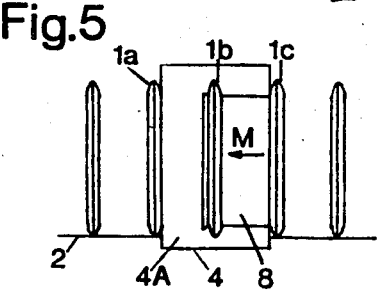
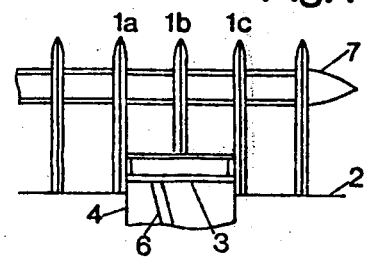
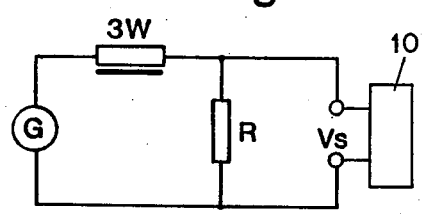
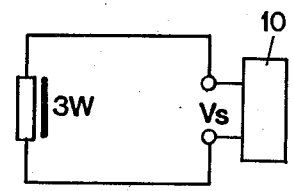

ELECTRONIC CONTROL DEVICE ON A GRIPPER SHUTTLE WEAVING MACHINE

CROSS REFERENCE TO RELATED APPLICATION

This application is related to the commonly assigned, copending U.S. application Ser. No. 06/327,560, filed Dec. 4, 1981 entitled "Electronic Control Device on a Gripper Shuttle Weaving Machine".

BACKGROUND OF THE INVENTION

The present invention relates to a new and improved inductive projectile sensor on a gripper shuttle weaving machine comprising a lathe beam and thereto attached projectile guide teeth made of magnetizable material, for producing a control signal indicative of the projectile passage.

Swiss Pat. No. 469,839 discloses a projectile sensor or sensing head on a gripper shuttle or projectile weaving machine arranged outside the weaving shed in the projectile catch box of the machine. Among other things, there are provided inductive or magnetic sensing heads comprising permanent magnetic means for furnishing a magnetic D.C. field. The projectile of known gripper shuttle weaving machines consists at least partly of steel, that is a magnetic or magnetizable material, such as to be able to change the magnetic resistance of the sensing head when the projectile passes the latter, and to produce an electrical sensing or control signal. This type of projectile sensor may be used in cases where the sensing or control signal is to be effective at the end of the shot or projectile flight rather than in cases where a sensing signal is to be derived during the projectile flight along the lathe beam.

SUMMARY OF THE INVENTION

It is a primary object of the present invention to provide an inductive projectile sensor which may be generally used in the last-mentioned cases where a control or sensing signal must be furnished by the flying projectile, e.g. for monitoring or measuring the speed of the flying projectile.

It is a more specific object of the invention to furnish an inductive projectile sensor for producing a start pulse which defines the start of a filling or weft thread monitoring interval in a weft thread monitoring device.

It is a further object of the invention to provide an inductive projectile sensor for controlling functions of a gripper shuttle weaving machine, such as the operation of a thread brake arranged at the picking side of the weaving machine.

These objects and others which will become more readily apparent as the description proceeds are implemented by the inductive projectile sensor of this invention which comprises an induction coil located at the top surface of the lathe beam and surrounding at least one of the guide teeth, and means for magnetizing at least said one guide tooth.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a view of an inductive projectile sensor as seen from the front of the weaving machine;

FIG. 2 shows the projectile sensor in top plan view;

FIG. 3 depicts the projectile sensor as seen along the line III—III in FIG. 1;

FIG. 4 shows the projectile sensor and a projectile passing by the same;

FIG. 5 illustrates in top plan view a modified component of the projectile sensor depicted in FIGS. 1 through 3; and FIGS. 6 and 7 respectively show a block schematic diagram of electrical components connected to the inductive projectile sensors illustrated in FIGS. 1 through 5 and serving to form a control signal.

DETAILED DESCRIPTION OF THE PREFERRED EMBODIMENT

With reference to FIGS. 1, 2 and 3, there are shown guide teeth 1,1a,1b,1c and so forth which are attached to a lathe beam 2 and serve for guiding the projectile 7 during the flight thereof through the weaving shed of a projectile or gripper shuttle weaving machine of conventional construction. A projectile sensor or induction coil 3 of substantially rectangular shape, as shown in FIG. 2, surrounds one of the guide teeth 1b immediately above the lathe beam 2 and is fitted into the space between adjacent guide teeth 1a,1c. For fixing the induction coil 3 to the lathe beam 2, there is provided a right-angled coil support 4, as shown in FIG. 3, which is fixed to the front of the lathe beam 2 by means of a screw 5 or equivalent fastening structure. The induction coil 3 may be cemented to the top surface of the right-angled support or holder 4. The winding 3W, FIGS. 1 and 3, of the induction coil 3 is connectable through a double-wire conductor or cable 6 to the terminals or input Vs of an electronic circuit 10 as shown in FIGS. 6 and 7.

The conductor 6 is preferably mounted along the pivot or swivel shaft of the lathe in order to minimize the torque applied thereto. Components of the circuits shown in FIGS. 6 or 7 may be integrated with the induction coil 3 or mounted in close vicinity thereto on the lathe beam 2. The coil support 4 may be made of a magnetizable material which, however, is only slightly magnetic, such as iron. In this case, a magnetic field must be produced by a D.C.-source G, FIG. 6, connected with the winding 3W of the induction coil 3, such that the induction coil 3, FIGS. 1, 2 and 3, has flowing therethrough a D.C.-current and forms, together with the coil support 4 and the guide teeth 1a,1b,1c, an open magnetic circuit. This magnet circuit as illustrated in front view in FIG. 1 has the shape of a reposing E with magnetic poles at the top or free ends of the guide teeth 1a,1b,1c. This open magnetic circuit is briefly closed by the passing projectile 7, FIG. 4, such that its magnetic resistance or inductance is abruptly changed. As a consequence, a brief voltage pulse appears in the winding 3W from which a control signal is derived.

FIG. 5 shows a modification of the coil support 4—the induction coil 3 here being removed for the sake of clarity in illustration. Between the guide teeth 1b and 1c there is located a small plate or lamella 8 which is permanently magnetized in the direction of the arrow M and which directly rests upon the top surface of the lathe beam 2. The coil support 4 has a recess for receiving the lamella 8 such that the upper part 4A of the coil support 4 resting upon the lathe beam 2 substantially has the shape of the letter C. As a consequence, the guide teeth 1b and 1c which are in contact with the lamella 8 are premagnetized such as to form, together with the lamella 8, an open C-shaped magnetic circuit or core. With such an arrangement, the winding 3W of the induction coil 3 provided for furnishing an electric signal need not be connected to a D.C.-source as shown in FIG. 6.

The above-described inductive projectile sensor is simply constructed and may be easily and quickly mounted at any place at the lathe beam 2.

FIG. 6 shows a circuit in which the winding 3W of the projectile sensor 3 shown in FIGS. 1, 2 and 3 is connected to the D.C.-source G in order to furnish a magnetic field by D.C.-excitation of the induction coil 3. The winding 3W is connected in series with a resistor R and the D.C.-source G of e.g. 12 Volts. A control signal may be removed at the terminals of the resistor R and delivered at the inputs Vs to the electronic circuit 10.

FIG. 7 illustrates a circuit which may be used together with the winding 3W in case a magnetic field is produced by a permanent magnet or lamella 8, as explained above with reference to FIG. 5. In this case, a control signal Vs may be directly derived at the terminals of the winding 3W and delivered at the inputs Vs to the electronic circuit 10. The winding 3W may comprise e.g. 700 turns of a copper wire of 0.1 mm diameter. The magnitude of the resistance of the resistor R, FIG. 6, is then about 200 Ohms. This provides for an electrical voltage pulse having a step leading edge and an amplitude of about 0.2 Volts, whereas the noise amplitude may be in the order of about 0.01 Volts.

It is to be understood that embodiments other than those described above with reference to FIGS. 1 through 7 may be used. Thus, a D.C.-source G, FIG. 6, or a permanent magnet or lamella 8, FIG. 5, may be dispensed with in case the projectile 7 is permanently magnetized. Further, in place of one winding 3W in the induction coil 3, there may be provided two separate windings, one of which is connected to a D.C.-source as shown in FIG. 6 for producing a magnetic field, whereas the other winding is provided for furnishing a control signal.

While there are shown and described present preferred embodiments of the invention, it is to be distinctly understood that the invention is not limited thereto, but may be otherwise variously embodied and practiced within the scope of the following claims. Accordingly,

What I claim is:

1. An inductive projectile sensor on a gripper shuttle weaving machine comprising a lathe beam and thereto attached projectile guide teeth made of magnetizable material, for producing a control signal indicative of the projectile passage, wherein the projectile sensor comprises:
    an induction coil located at a top surface of the lathe beam and surrounding at least one of the guide teeth; and
    means for magnetizing at least said one guide tooth.
2. The inductive projectile sensor as defined in claim 1, wherein:
    said means for magnetizing said at least one guide tooth comprises a D.C.-source connected to the induction coil.
3. The inductive projectile sensor as defined in claim 1, wherein:
    said means for magnetizing said at least one guide tooth comprises a projectile composed at least in part of permanently magnetized material.
4. The inductive projectile sensor as defined in claim 1, wherein:
    said inductive sensor including said coil are releasably mounted at said at least one guide tooth to enable said inductive sensor to be shifted and remounted at any other selected one of said guide teeth, in order to accommodate the position of the sensor to the width of a fabric which is woven at the weaving machine.
5. The inductive projectile sensor as defined in claim 1, wherein:
    said guide tooth piercingly extends through said induction coil and simultaneously serves as a core for the inductive sensor.
6. An inductive projectile sensor on a gripper shuttle weaving machine comprising a lathe beam and thereto attached projectile guide teeth made of magnetizable material, for producing a control signal indicative of the projectile passage, wherein the projectile sensor comprises:
    an induction coil located at a top surface of the lathe beam and surrounding at least one of the guide teeth;
    means for magnetizing at least said one guide tooth; and
    said means for magnetizing said at least one guide tooth comprises a substantially plate-shaped permanent magnet arranged between a first guide tooth surrounded by the induction coil and a second guide tooth adjacent the induction coil.

* * * * *